No. 650,142. Patented May 22, 1900.
I. ALLAMAN.
TIRE TIGHTENER.
(Application filed Feb. 6, 1900.)
(No Model.)
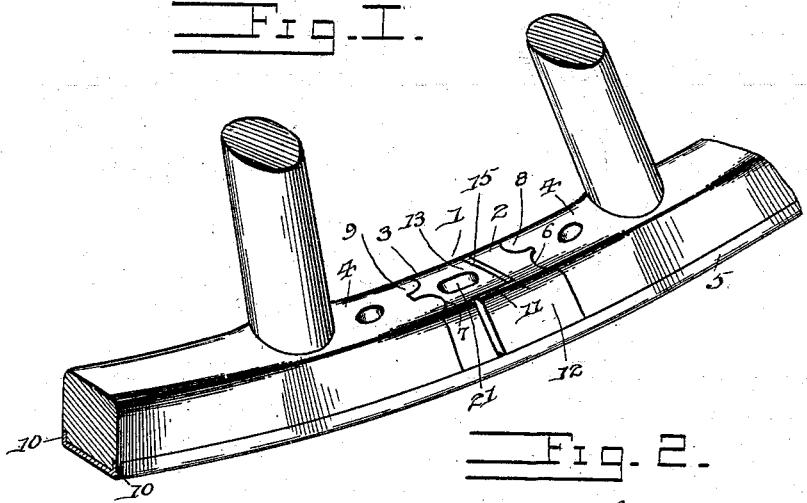
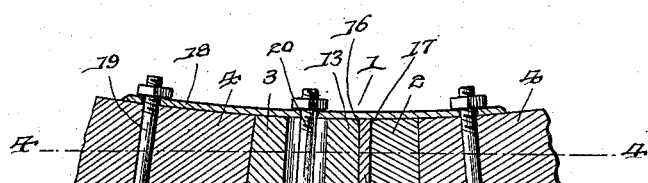
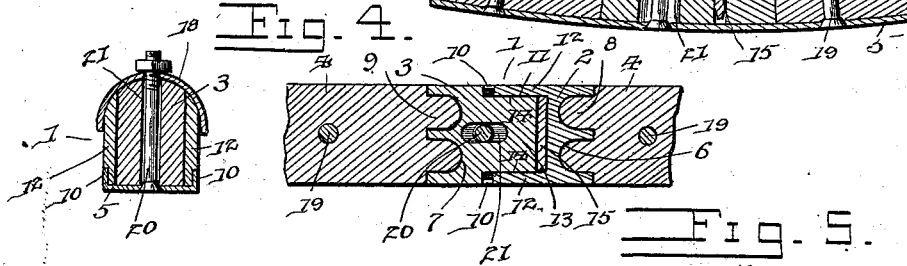
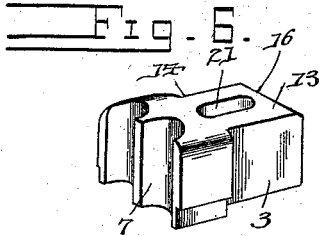
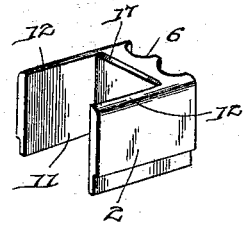
Witnesses
F. E. Alden
J. F. Riley
Isaac Allaman, Inventor
By his Attorneys
C. A. Snow & Co.

UNITED STATES PATENT OFFICE.

ISAAC ALLAMAN, OF HUMMELSTOWN, PENNSYLVANIA, ASSIGNOR OF THREE-FOURTHS TO SAMUEL F. ALLAMAN, JOHN H. ALLAMAN, AND ADAM ALLAMAN, OF SAME PLACE.

TIRE-TIGHTENER.

SPECIFICATION forming part of Letters Patent No. 650,142, dated May 22, 1900.

Application filed February 6, 1900. Serial No. 4,203. (No model.)

*To all whom it may concern:*

Be it known that I, ISAAC ALLAMAN, a citizen of the United States, residing at Hummelstown, in the county of Dauphin and State of Pennsylvania, have invented a new and useful Tire-Tightener, of which the following is a specification.

The invention relates to improvements in tire-tighteners.

The object of the present invention is to improve the construction of tire-tighteners and to provide a simple and inexpensive device adapted to permit a wheel to be readily expanded to tighten the tire to avoid upsetting the latter and capable of effectually preventing the felly-sections from bulging at the joints.

The invention consists in the construction and novel combination and arrangement of parts hereinafter fully described, illustrated in the accompanying drawings, and pointed out in the claims hereto appended.

In the drawings, Figure 1 is a perspective view of a portion of a wheel provided with a tire-tightener constructed in accordance with this invention, the clip-plate being removed. Fig. 2 is a longitudinal sectional view. Fig. 3 is a transverse sectional view. Fig. 4 is a sectional view on line 4 4 of Fig. 2. Figs. 5 and 6 are detail views of the overlapping adjustable sections.

Like numerals of reference designate corresponding parts in all the figures of the drawings.

1 designates a tire-tightener composed of overlapping adjustable or extensible sections 2 and 3, interposed between the sections 4 of the felly of a wheel and adapted when the tire 5 becomes loose through any cause whatever to expand the felly-sections, and thereby tighten the felly and obviate the necessity of upsetting the same. The sections 2 and 3 of the tire-tightener are provided at their outer ends with parallel grooves or semisockets 6 and 7, extending from the tire to the inner periphery of the felly and receiving projecting portions 8 and 9 of the same, whereby the ends of the felly-sections are bound or supported and are effectually prevented from bulging or splitting when the wheel is expanded by the means hereinafter described. The portions 8 and 9 of the ends of the felly-sections are rounded to form ribs or protuberances, and the grooves or semisockets are approximately semicircular in cross-section to conform to the configuration of the ribs or projecting portions.

The tire may be provided at its edges with flanges 10 to form a groove or channel for the reception of a felly; but when this construction is employed the felly and the sections of the tire-tightener will be provided at their sides with recesses or rabbets to receive the flanges, so that the outer edges of the tire will be flush with the adjacent faces of the felly.

The section 2 is provided with a longitudinal recess 11, formed by sides 12 and receiving a reduced portion 13 of the section 3, which is recessed at opposite sides at 14 to provide the said reduced portion 13. This construction provides an overlapping substantially-telescoping connection, and the sections are adapted to be extended to expand the wheel, and they may also be adjusted inwardly to prevent a wheel from becoming dished should the parts swell in damp weather. The sections of the tire-tightener are extended by means of a ledge or key 15, arranged in the recess 11 and interposed between the back of the same and the adjacent end of the reduced portion 13, and one or more wedges or keys may be employed or keys or wedges of different thicknesses may be used to effect the proper adjustment of the felly-sections. The sides of the section 2 fit in the side recesses or cut-away portions 14 of the section 3, and the outer faces of the sections are flush or in the same plane when the parts are assembled. The reduced portion 13 and the back of the recess 11 are beveled at 16 and 17 to facilitate the introduction of a wedge or key, which is preferably beveled or tapered at the inner end, as shown.

The tire-tightener is covered by the usual clip-plate or hood 18, provided at its ends with perforations for the reception of tire-bolts 19 and having a central perforation for a tire-bolt 20, which passes through a longitudinal slot 21 of the section 3 of the tire-tightener. The slot which is formed in the reduced portion 13 is of sufficient length to permit the sections to be adjusted or extended to expand a felly to the maximum extent.

It will be seen that the tire-tightener is exceedingly simple and inexpensive in construction, that it is adapted to be readily operated, and that it is capable of expanding a wheel and of permitting the parts to expand without dishing, whereby upsetting the tire and similar operations are obviated.

What is claimed is—

1. In a device of the class described, the combination with felly-sections provided at their ends with projections or ribs extending from the tire to their inner periphery, the tire-tightener sections provided at their outer ends with grooves or semisockets receiving the projecting portions or ribs of the felly-sections, and a wedge or key for expanding the sections of the tire-tightener, substantially as described.

2. In a device of the class described, the combination with a tire, and felly-sections, of the overlapping expansible tire-tightener sections interposed between and interlocked at their outer ends with the felly-sections, means for expanding the tire-tightener sections, a tire-bolt extending through a longitudinal slot of one of the latter, and a clip-plate or hood engaged by the said fastening device, substantially as described.

3. In a device of the class described, the combination with a tire and felly-sections provided with ribs, of the tire-tightener sections 2 and 3 overlapping each other and provided at their outer ends with grooves receiving the projections or ribs of the felly-sections, one of the sections of the tire-tightener being provided with a longitudinal slot, a key for expanding the sections of the tire-tightener, and a clip-plate or hood having one of its fastening devices passing through the said slot, substantially as described.

In testimony that I claim the foregoing as my own I have hereto affixed my signature in the presence of two witnesses.

ISAAC ALLAMAN.

Witnesses:
J. A. HUMMEL,
JOSIAH P. DASHER.